Patented Sept. 22, 1936

2,054,966

UNITED STATES PATENT OFFICE 2,054,966

MEANS AND METHOD FOR DEODORIZING

Bert O. Crites, University Heights, Ohio, assignor to The Gibbs Manufacturing Company, Canton, Ohio, a corporation of Ohio No Drawing. Application November 16, 1934, Serial No. 753,353

4 Claims. (Cl. 252—2.5)

This invention relates to closets and the like and deodorizing and disinfecting; and it is among the objects of the invention to provide a means and a method conveniently applicable wherever desired, and particularly advantageous for toilet rooms, closets, and like usage.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

In combating odors, and particularly in toilet rooms, heretofore it has been customary to depend upon overpowering the odor by a more obtrusive one, such as terpene derivatives. By the present invention, the odor is attacked rather by means directed toward its removal, and in general I bring into operation an agent to this end and further the action by agitation and an inert or odorless gas, preferably the latter accomplishing the agitation.

As agent for attacking the odorous gas, I employ a finely divided adsorbent, most desirably activated carbon, and another gas. In some cases animal charcoal or other adsorbent may be employed somewhat less efficiently. A composition is made up to include the adsorbent agent, and reactants for generating a gas, such as a carbonate and an agent furnishing an acid ion for action thereon. While such carbonates as calcium carbonate, sodium carbonate, and the like may be employed, sodium bicarbonate is generally preferable. The agent furnishing the acid ion for reaction may be an acid salt, as an acid sulphate, acid phosphate, alum, and the like, and preferably sodium acid sulphate. I have found that incorporation of sodium chloride also is of particular advantage, favoring the decomposition of the carbonate. As readily understood from the foregoing, these materials on contact with water allow reaction between the carbonate and the agent furnishing the acid ion, and effervescent generation of a gas, carbon dioxide, ensues, agitating the particles of adsorbent agent, facilitating their surface-presentation to the gas to be removed, and at the same time facilitating the general action by the agitation of the gaseous atmosphere also. With removal of the odorous gas, it is of advantage in many instances to also provide a pleasant positive odorous agent taking its place, and desirably I may incorporate in the composition a volatile agent of this character, such as soap-perfumes, also a disinfectant, such as para dichlorbenzene and the like, a desirable soap perfume being for instance the commercial "Javeline" as generally used in mild-scented toilet soaps. The composition may thus all together comprise adsorbent agent 12.5 to 15 per cent by weight, carbonate 23.7 to 30.7 per cent, an acid salt 25 to 37.5 per cent, sodium chloride 15.8 to 20.4 per cent, pleasant odor ingredient .5 to .9 per cent, and disinfectant 3 to 5 per cent. As a further refinement, in order to avoid possible premature interaction between the carbonate and acid ion agent if kept in exposure under unfavorable atmospheric humidity conditions, I may make up the composition in two components, one containing the carbonate, and the other the acid ion agent, the components being brought together at time of usage. Thus, with the acid ion agent in one component, and the carbonate in the other, the remaining ingredients of the total composition may be apportioned between such two components, the adsorbent being made up with one for instance and sodium chloride with the other, and the volatile pleasant odorous agent and the disinfectant with either component as preferred.

In the use of the means as set forth foregoing, for deodorizing, a charge of the composition is supplied to the closet bowl or other point of usage, manually or by a dispenser as desired. A charge-amount of ⅓ to ¾ oz. may be dispensed, the precise amount depending somewhat upon the size of the compartment, bowl, pan, or the like to which the treatment is applied. And, in instances in which the composition is made up as two components to be brought together at time of usage, such components likewise may be supplied or dispensed to the compartment, bowl, pan or the like, in succession, or if preferred simultaneously by suitable combined dispensing arrangement, and on contact with water in the bowl or pan the acid ion agent reacts upon the carbonate, with effervescent generation of carbon dioxide, and corresponding agitation and dissemination of the adsorbent agent, also agitation of the superjacent atmosphere, with accelerated exposure thereof to the adsorbent, and dissemination of the volatile pleasant odorous agent and the disinfectant.

As an example, the deodorizing means may be made up as follows:—

One composition component (conveniently designated "No. I") to include activated carbon 25 per cent and sodium acid sulphate 75 per cent. The other component (conveniently designated "No. II") to include sodium bicarbonate 45.7 per cent, sodium chloride 38.8 per cent, para dichlorbenzene 13.7 per cent, and soap perfume "Javeline" 1.8 per cent.

As above-indicated, about equal amounts of No. I and No. II, for instance ⅓ oz. each, are dispensed, No. I first, and then No. II, by suitable dispensing arrangement, and the deodorizing ensues on contact with the water in the bowl or the like. Where there is no fear of premature interaction if the components be initially made up together, the illustrative ingredients mentioned may of course be initially made up in admixture preparation together, and be thus dispensed. In general, it is desirable to maintain the material in loose pulverulent form, with the advantage of free flowability and quick action, rather than in a solidified or tabloid form.

As thus seen, a rapidly acting and efficient and withal a very conveniently applicable deodorization may be effected, whether for instance directly in connection with a closet bowl, or other fixed installation, or a more temporary device such as a bedpan, chamber, or the like, or even by dispensing directly into water in a container merely for that purpose, in any compartment or room in which deodorization is desired.

Other modes of applying the principle of the invention may be employed, change being made as regards the details described, provided the features stated in any of the following claims, or the equivalent of such, be employed.

I therefore particularly point out and distinctly claim as my invention:—

1. A method of disposing of odorous gases in the presence of water in toilets etc., which comprises throwing into the water a deodorizing agent and vigorously agitating same by an alkali carbonate and an acid salt reactive together on contact with the water to generate carbon dioxide.

2. A method of disposing of odorous gases in the presence of water in toilets etc., which comprises throwing into the water a deodorizing adsorbent and a gas generating component and vigorously agitating same by effervescing non-explosive inoffensive gas generated on contact with the water, of the gas generating component.

3. Means for disposing of odorous gases in the presence of water in toilets etc., which comprises a deodorizing agent and means for vigorously agitating same including an alkali carbonate and an acid salt reactive together on contact with the water to generate carbon dioxide.

4. Means for disposing of odorous gases in the presence of water in toilets etc., which comprises a deodorizing adsorbent and a gas generating component and means for vigorously agitating same including an effervescent non-explosive inoffensive gas-generating material reactive on contact with the water, of the gas generating component.

BERT O. CRITES.